US011527073B2

United States Patent
Choi et al.

(10) Patent No.: US 11,527,073 B2
(45) Date of Patent: Dec. 13, 2022

(54) SYSTEM AND METHOD FOR PROVIDING AN INTERPRETABLE AND UNIFIED REPRESENTATION FOR TRAJECTORY PREDICTION

(71) Applicant: Honda Motor Co., Ltd.

(72) Inventors: Chiho Choi, San Jose, CA (US); Shan Su, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 16/911,661

(22) Filed: Jun. 25, 2020

(65) Prior Publication Data

US 2021/0150225 A1    May 20, 2021

Related U.S. Application Data

(60) Provisional application No. 62/936,051, filed on Nov. 15, 2019.

(51) Int. Cl.
*G06T 7/20*     (2017.01)
*G06V 20/56*    (2022.01)
(Continued)

(52) U.S. Cl.
CPC .............. *G06V 20/56* (2022.01); *G05D 1/021* (2013.01); *G05D 1/0231* (2013.01); *G06T 7/20* (2013.01);
(Continued)

(58) Field of Classification Search
CPC ...... G06V 20/56; G06V 20/17; G06V 10/751; G06V 10/806; G05D 1/021; G05D 1/0231; G05D 1/0212; G06T 7/20; G06T 7/246; G06T 2207/10032; G06T 2207/30241; G06T 2207/30252; G06T 2207/20081;
(Continued)

(56) References Cited

U.S. PATENT DOCUMENTS

2016/0272199 A1* 9/2016 Kawahara ................ G08G 1/16
2017/0031362 A1* 2/2017 Olson ................... G05D 1/0278

FOREIGN PATENT DOCUMENTS

WO    WO-2016158341 A1 * 10/2016 ............ B60W 30/09

OTHER PUBLICATIONS

Woo, Hanwool, Yonghoon Ji, Hitoshi Kono, Yusuke Tamura, Yasuhide Kuroda, Takashi Sugano, Yasunori Yamamoto, Atsushi Yamashita, and Hajime Asama. "Lane-change detection based on vehicle-trajectory prediction." IEEE Robotics and Automation Letters 2, No. 2 (2017): 1109-1116. (Year: 2017).*
(Continued)

*Primary Examiner* — Carol Wang
(74) *Attorney, Agent, or Firm* — Rankin, Hill & Clark LLP

(57) ABSTRACT

A system and method for providing an interpretable and unified representation for trajectory prediction that includes receiving birds-eye image data associated with travel of at least one agent within a roadway environment. The system and method also include analyzing the birds-eye image data to determine a potential field associated with the roadway environment and analyzing the birds-eye image data to determine a potential field associated with a past trajectory of the at least one agent. The system and method further include predicting a future trajectory of the at least one agent based on analysis of the potential fields.

20 Claims, 7 Drawing Sheets

(51) Int. Cl.
  *G05D 1/02* (2020.01)
  *G08G 1/052* (2006.01)
  *B60W 60/00* (2020.01)
(52) U.S. Cl.
  CPC ......... *G08G 1/052* (2013.01); *B60W 60/0025* (2020.02); *B60W 2420/42* (2013.01); *G06T 2207/10032* (2013.01); *G06T 2207/30241* (2013.01); *G06T 2207/30252* (2013.01)
(58) Field of Classification Search
  CPC ........... G06T 2207/20084; G06T 2207/30236; G08G 1/052; G08G 1/0116; G08G 1/0129; G08G 1/04; G08G 1/164; B60W 60/0025; B60W 2420/42; G06K 9/629
  See application file for complete search history.

(56) References Cited

OTHER PUBLICATIONS

Alexandre Alahi, Kratarth Goel, Vignesh Ramanathan, Alexandre Robicquet, Li Fei-Fei, and Silvio Savarese. Social lstm: Human trajectory prediction in crowded spaces. In Proceedings of the IEEE conference on computer vision and pattern recognition, pp. 961-971, 2016.
Jerome Barraquand, Bruno Langlois, and J-C Latombe. Numerical potential field techniques for robot path planning. IEEE transactions on systems, man, and cybernetics, 22(2):224-241, 1992.
Yuning Chai, Benjamin Sapp, Mayank Bansal, and Dragomir Anguelov. Multipath: Multiple probabilistic anchor trajectory hypotheses for behavior prediction, 2019.
Seth Chaiklin. The zone of proximal development in vygotsky's analysis of learning and instruction. Vygotsky's educational theory in cultural context, 1:39-64, 2003.
Rohan Chandra, Uttaran Bhattacharya, Aniket Bera, and Dinesh Manocha. Traphic: Trajectory prediction in dense and heterogeneous traffic using weighted interactions. In Proceedings of the IEEE Conference on Computer Vision and Pattern Recognition, pp. 8483-8492, 2019.
Kyunghyun Cho, Bart Van Merriënboer, Caglar Gulcehre, Dzmitry Bahdanau, Fethi Bougares, Holger Schwenk, and Yoshua Bengio. Learning phrase representations using rnn encoder-decoder for statistical machine translation. arXiv preprint arXiv:1406.1078, 2014.
Chiho Choi and Behzad Dariush. Looking to relations for future trajectory forecast. In Proceedings of the IEEE International Conference on Computer Vision (ICCV), Oct. 2019.
Shuzhi Sam Ge and Yun J Cui. Dynamic motion planning for mobile robots using potential field method. Autonomous robots, 13(3):207-222, 2002.
Tobias Glasmachers. Limits of end-to-end learning. In Proceedings of the Ninth Asian Conference on Machine Learning, vol. 77 of Proceedings of Machine Learning Research, pp. 17-32. PMLR, Nov. 15-17, 2017.
David J Griffiths. Introduction to electrodynamics, 2005.
Agrim Gupta, Justin Johnson, Li Fei-Fei, Silvio Savarese, and Alexandre Alahi. Social gan: Socially acceptable trajectories with generative adversarial networks. In Proceedings of the IEEE Conference on Computer Vision and Pattern Recognition, pp. 2255-2264, 2018.
Irtiza Hasan, Francesco Setti, Theodore Tsesmelis, Alessio Del Bue, Fabio Galasso, and Marco Cristani. Mx-lstm: mixing tracklets and vislets to jointly forecast trajectories and head poses. In Proceedings of the IEEE Conference on Computer Vision and Pattern Recognition, pp. 6067-6076, 2018.
Dirk Helbing and Peter Molnar. Social force model for pedestrian dynamics. Physical review E, 51(5):4282, 1995.
Sepp Hochreiter and Jürgen Schmidhuber. Long short-term memory. Neural computation, 9(8):1735-1780, 1997.
Yong Koo Hwang and Narendra Ahuja. A potential field approach to path planning. IEEE Transactions on Robotics and Automation, 8(1):23-32, 1992.
Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.
Rudolph Emil Kalman. A new approach to linear filtering and prediction problems. 1960.
Brenden M Lake, Tomer D Ullman, Joshua B Tenenbaum and Samuel J Gershman. Building machines that learn and think like people. Behavioral and brain sciences, 40, 2017.
Namhoon Lee, Wongun Choi, Paul Vernaza, Christopher B Choy, Philip HS Torr, and Manmohan Chandraker. Desire: Distant future prediction in dynamic scenes with interacting agents. In Proceedings of the IEEE Conference on Computer Vision and Pattern Recognition, pp. 336-345, 2017.
Alon Lerner, Yiorgos Chrysanthou, and Dani Lischinski. Crowds by example. In Computer graphics forum, vol. 26, pp. 655-664. Wiley Online Library, 2007.
Matthias Luber, Johannes A Stork, Gian Diego Tipaldi, and Kai O Arras. People tracking with human motion predictions from social forces. In 2010 IEEE International Conference on Robotics and Automation, pp. 464-469. IEEE, 2010.
Stefano Pellegrini, Andreas Ess, Konrad Schindler, and Luc Van Gool. You'll never walk alone: Modeling social behavior for multi-target tracking. In 2009 IEEE 12th International Conference on Computer Vision, pp. 261-268. IEEE, 2009.
John H Reif and Hongyan Wang. Social potential fields: A distributed behavioral control for autonomous robots. Robotics and Autonomous Systems, 27(3):171-194, 1999.
Alexandre Robicquet, Amir Sadeghian, Alexandre Alahi, and Silvio Savarese. Learning social etiquette: Human trajectory understanding in crowded scenes. In European conference on computer vision, pp. 549-565. Springer, 2016.
Andrey Rudenko, Luigi Palmieri, Michael Herman, Kris M. Kitani, Dariu M. Gavrila, and Kai O. Arras. Human motion trajectory prediction: A survey, 2019.
Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. International journal of computer vision, 115(3):211-252, 2015.
Amir Sadeghian, Vineet Kosaraju, Ali Sadeghian, Noriaki Hirose, Hamid Rezatofighi, and Silvio Savarese. Sophie: An attentive gan for predicting paths compliant to social and physical constraints. In The IEEE Conference on Computer Vision and Pattern Recognition (CVPR), Jun. 2019.
Christoph Schöller, Vincent Aravantinos, Florian Lay, and Alois Knoll. What the constant velocity model can teach us about pedestrian motion prediction, 2019.
Kihyuk Sohn, Honglak Lee, and Xinchen Yan. Learning structured output representation using deep conditional generative models. In Advances in neural information processing systems, pp. 3483-3491, 2015.
Jack M Wang, David J Fleet, and Aaron Hertzmann. Gaussian process dynamical models for human motion. IEEE transactions on pattern analysis and machine intelligence, 30(2):283-298, 2007.
Christopher KI Williams. Prediction with gaussian processes: From linear regression to linear prediction and beyond. In Learning in graphical models, pp. 599-621. Springer, 1998.
Hao Xue, Du Q Huynh, and Mark Reynolds. Ss-lstm: A hierarchical lstm model for pedestrian trajectory prediction. In 2018 IEEE Winter Conference on Applications of Computer Vision (WACV), pp. 1186-1194. IEEE, 2018.
Takuma Yagi, Karttikeya Mangalam, Ryo Yonetani, and Yoichi Sato. Future person localization in first-person videos. In Proceedings of the IEEE Conference on Computer Vision and Pattern Recognition, pp. 7593-7602, 2018.
Francesco Zanlungo, Tetsushi Ikeda, and Takayuki Kanda. Social force model with explicit collision prediction. EPL (Europhysics Letters), 93(6):68005, 2011.

(56) References Cited

OTHER PUBLICATIONS

Tianyang Zhao, Yifei Xu, Mathew Monfort, Wongun Choi, Chris Baker, Yibiao Zhao, Yizhou Wang, and Ying Nian Wu. Multi-agent tensor fusion for contextual trajectory prediction. In The IEEE Conference on Computer Vision and Pattern Recognition (CVPR), Jun. 2019.

Tianyang Zhao, Yifei Xu, Mathew Monfort, Wongun Choi, Chris Baker, Yibiao Zhao, Yizhou Wang, and Ying Nian Wu. Multi-agent tensor fusion for contextual trajectory prediction. In Proceedings of the IEEE Conference on Computer Vision and Pattern Recognition, pp. 12126-12134, 2019.

* cited by examiner

SYSTEM AND METHOD FOR PROVIDING AN INTERPRETABLE AND UNIFIED REPRESENTATION FOR TRAJECTORY PREDICTION

CROSS-REFERENCE TO RELATED APPLICATION

This application claims priority to U.S. Provisional Application Ser. No. 62/936,051 filed on Nov. 15, 2019, which is expressly incorporated herein by reference.

BACKGROUND

Predicting an agent's future trajectory may be a difficult task given complicated types of stimuli of motion. Prior works have focused on learning individual stimulus from different modules and fusing the representations in an end to end manner. However, the results of these works have made it difficult to understand what data is actually captured and how such data may be fused. Accordingly, accurate prediction of road agents' future motion remains a challenging problem given the high complexity of stimuli.

BRIEF DESCRIPTION

According to one aspect, a computer-implemented method for providing an interpretable and unified representation for trajectory prediction that includes receiving birds-eye image data associated with travel of at least one agent within a roadway environment. The computer-implemented method also includes analyzing the birds-eye image data to determine a potential field associated with the roadway environment and analyzing the birds-eye image data to determine a potential field associated with a past trajectory of the at least one agent. The computer-implemented method further includes predicting a future trajectory of the at least one agent based on analysis of the potential fields. A predicted direction and a predicted speed of motion of the at least one agent within the roadway environment are modeled to generate the future trajectory by recurrently moving past location on a displacement field.

According to another aspect, a system for providing an interpretable and unified representation for trajectory prediction that includes a memory storing instructions when executed by a processor cause the processor to receive birds-eye image data associated with travel of at least one agent within a roadway environment. The instructions also cause the processor to analyze the birds-eye image data to determine a potential field associated with the roadway environment and analyze the birds-eye image data to determine a potential field associated with a past trajectory of the at least one agent. The instructions further cause the processor to predict a future trajectory of the at least one agent based on analysis of the potential fields. A predicted direction and a predicted speed of motion of the at least one agent within the roadway environment are modeled to generate the future trajectory by recurrently moving past location on a displacement field.

According to yet another aspect, a non-transitory computer readable storage medium storing instructions that when executed by a computer, which includes a processor perform a method that includes receiving birds-eye image data associated with travel of at least one agent within a roadway environment. The method also includes analyzing the birds-eye image data to determine a potential field associated with the roadway environment and analyzing the birds-eye image data to determine a potential field associated with a past trajectory of the at least one agent. The method further includes predicting a future trajectory of the at least one agent based on analysis of the potential fields. A predicted direction and a predicted speed of motion of the at least one agent within the roadway environment are modeled to generate the future trajectory by recurrently moving past location on a displacement field.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
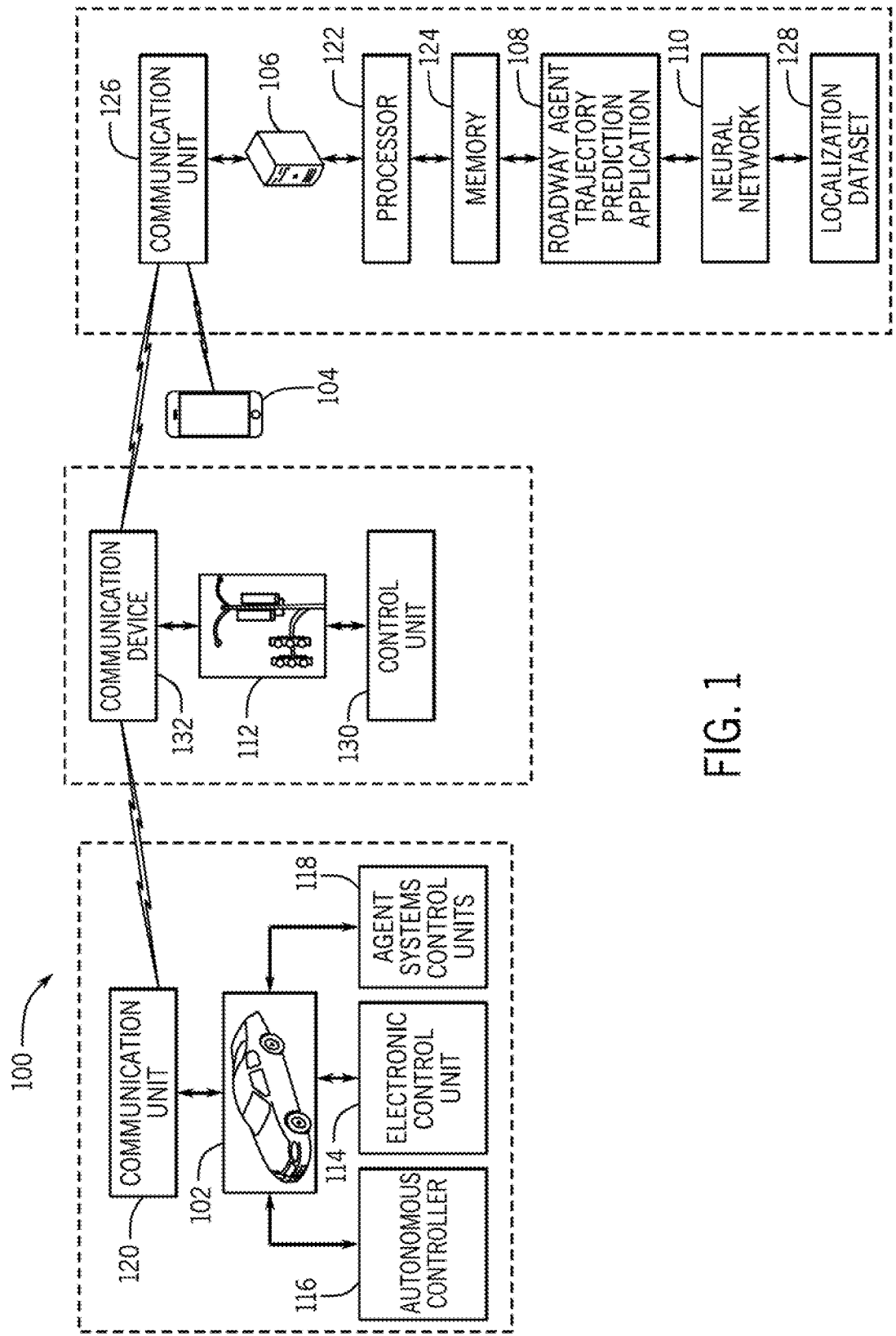
FIG. 1 is a schematic view of an exemplary system for providing an interpretable and unified representation for trajectory prediction according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for providing an interpretable and unified representation for trajectory prediction according to an exemplary embodiment of the present disclosure. The components of the system 100, as well as the components of other systems, hardware architectures, and software architectures discussed herein, may be combined, omitted, or organized into different architectures for various embodiments.

Figure 2B:
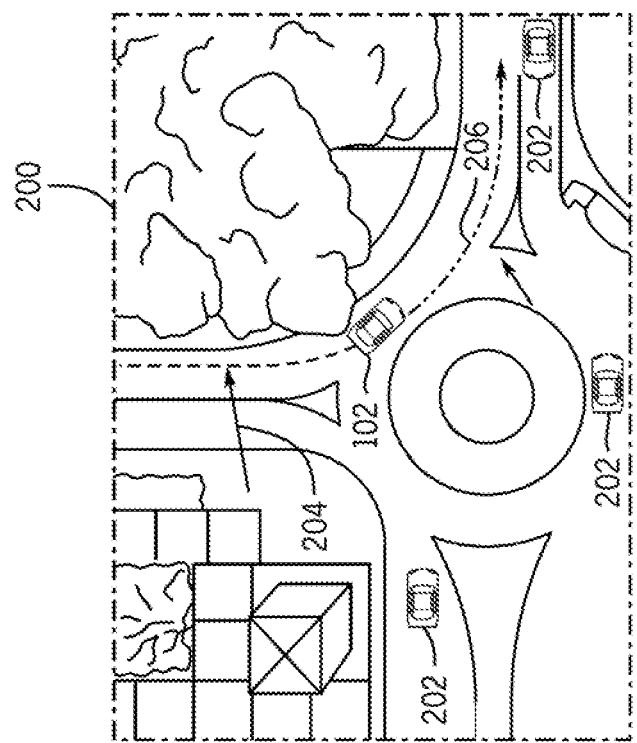
FIG. 2B is an illustrative example of an agent and a plurality of additional agents that traveling within the roadway environment according to an exemplary embodiment of the present disclosure.
Figure 2A:
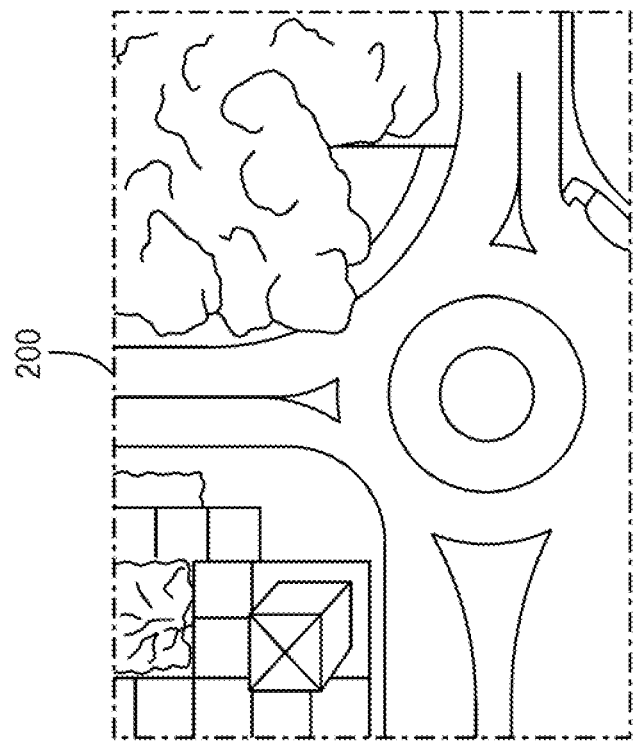
FIG. 2A is an illustrative example of a roadway environment according to an exemplary embodiment of the present disclosure.

Generally the system 100 includes an agent 102 that may be located within a roadway environment (illustrated in FIG. 2A). In one embodiment, the agent 102 may be configured as a mechanical agent and may include, but may not be limited to, an automobile, a robot, a motor bike, a wheel chair/scooter, a construction crane, an airplane, and the like that may be traveling within the roadway environment. In another embodiment, the agent 102 may alternatively include a human pedestrian, bicyclist, and/or passenger (e.g., vehicle passenger) (not shown) that may utilize a portable device 104.

As shown in FIG. 2A, the roadway environment 200 may include one or more types of environments that include one or more roadways (i.e., pathways) that may be utilized by the agent 102 and/or one or more additional agents that are traveling within the roadway environment 200 (e.g., traveling on one or more roadways of the roadway environment 200). The roadway environment 200 may be configured in a variety of manners (e.g., straight paths, circles, intersections, on/off ramps). The roadway environment 200 may be configured in one or more external environments or internal environments in addition to the exemplary roadway circle configuration of the roadway environment 200 shown in FIG. 2A. For example, the roadway environment 200 may include an environment with external pathways such as roadway intersections, roadway circles, highways, on/off ramps, airport taxiways, construction site pathways, external walkways, and the like. The roadway environment may also include internal pathways such as an airport terminals, factory floors, internal walkways, and the like.

With continued reference to FIG. 1, the system 100 may include an externally hosted computing infrastructure (external server) 106 that may be configured to execute a roadway agent trajectory prediction application (trajectory prediction application) 108 that may be configured to receive one or more birds-eye (e.g., overhead) images of the roadway environment 200 and complete electronic analysis of the birds-eye images using a neural network 110 to predict one or more future trajectories of the agent 102 and/or one or more additional agents that are traveling within the roadway environment 200.

The trajectory prediction application 108 may be configured to receive the birds-eye image data that may pertain to one or more birds-eye images captured of the roadway environment 200 from one or more sources. In an exemplary embodiment, as shown in FIG. 1, the one or more bird-eye images may be captured by one or more overhead cameras (not shown) of a road side equipment (RSE) 112 that may be located within the roadway environment 200 (e.g., with the cameras located above one or more roadways of the roadway environment 200). In alternate embodiments, the one or one or more bird-eye images may be captured by aerial drones and/or additional types of aircraft that are flying overhead above the roadway environment 200. For purposes of simplicity, this disclosure will discuss the birds-eye images mainly being captured by one or more overhead cameras of the RSE 112. However, it is to be appreciated that similar functionality and utilization of bird-eye images and respective birds-eye data may pertain to one or more birds-eye images that may be captured by aerial drones and/or additional types of aircraft that are flying overhead above the roadway environment 200.

As discussed in more detail below, the trajectory prediction application 108 may be configured to receive birds-eye image data from the RSE 112. The application 108 may be configured to analyze the birds-eye image data to determine a road structure of the roadway environment 200 in which the agent 102 and/or one or more additional agents is traveling. The road structure of the roadway environment 200 may refer to the structural configuration of one or more roadways of the roadway environment 200. The structural configuration may pertain to but may not be limited to angles of curvature of one or more roadways, angles of incline of one or more roadways, configurations of one or more roadways (e.g., highway, two-lane road, intersection, circle, etc.), and the like. The road structure of the roadway environment 200 may also pertain to one or more dynamic objects located the roadway environment 200 such as one or more additional agents. The structure of the roadway environment 200 may additionally pertain to one or more static objects such as street signs, guardrails, and the like that may be included within the roadway environment 200. In particular, the structure of the roadway environment 200 may define the interaction between the agent 102 and the structural layout of one or more roadways. The structure of the roadway environment 200 may also define the interaction between the agent 102 with respect to one or more additional agents that may be traveling within the roadway environment 200.

The trajectory prediction application 108 may also be configured to analyze the birds-eye image data to determine a past trajectory of travel of the agent 102 and/or one or more additional agents traveling within the roadway environment 200. The past trajectories may pertain to past directions and locations of the agent 102 and/or one or more additional agents during one or more past time steps (t−1, t−2, t−3, etc.) during travel within the roadway environment 200. As discussed below, the trajectory prediction application 108 may be configured to determine potential fields that are determined from the road structure of the roadway environment 200 and potential fields that are determined from the past trajectories of the agent 102 and one or more additional agents traveling within the roadway environment 200.

The potential fields may be allocated to pixels of the birds-eye images that provide a unified representation of all environmental information that may be associated with the structural layout of the roadway environment 200 and may pertain to the respective past trajectories of the agent 102 and one or more additional agents that are traveling within the roadway environment 200. As represented in the illustrative example of FIG. 2B, the potential fields may pertain to invisible forces that may be associated with the structure of the roadway environment 200, the interactions between the agent 102 and additional agents 202, and the past trajectory 204 of the agent 102 that may be utilized to predict a predicted trajectory 206 of the agent 102 and one or more additional agents 202 traveling within the roadway environment 200.

The invisible forces that may be captured by the potential fields may include an environmental force, an inertial force, and a social force that may apply to the agent 102 and one or more additional agents 202 that are located within the roadway environment 200. In particular, the environmental force may pertains to invisible force that is determined by the structural layout of the roadway environment 200. The environmental force may naturally push the agent 102 and one or more additional agents 202 located within the roadway environment 200 to move along the structural confines of one or more roadways of the roadway environment 200. The environmental force may push the agent 102 and one or more additional agents 202 to avoid interaction with one or more stationary objects such as buildings, walls, vegetation, etc.

The inertial force that may be captured by the potential fields may pertain to the force that may guide the agent 102 and one or more additional agents 202 to move towards respective intended destinations. The inertial force may be interpreted based on the past trajectories of the agent 102 and the one or more additional agents 202 within the roadway environment 200 which may be used to infer future trajectories of the agent 102 and the one or more additional agents 202 as they travel within the roadway environment 200. The social forces may be derived from the motion of the agent 102 with respect to the motion of one or more additional agents 202. The social forces captured by the potential fields may be used to enable the predicted future trajectory of the agent 102 to be compatible with the predicted future trajectories of the one or more additional agents 202.

As discussed below, the potential fields may be analyzed by the neural network 110 to determine motion fields that may be merged to fuse the aforementioned forces to complete location prediction of the agent 102 and the one or more additional agents 202 within the roadway environment 200 to thereby control the operation of the agent 102 (e.g., that is configured as a mechanical agent) and/or provide one or more alerts to the agent 102 to avoid any overlap between the predicted future trajectory of the agent 102 and respective predicted future trajectories of the one or more additional agents 202 located within the roadway environment 200.

In an exemplary embodiment, if the agent 102 is configured as a mechanical agent (e.g., an automobile, a robot, a motor bike, a wheel chair/scooter, a construction crane, an airplane, etc.) the trajectory prediction application 108 may be configured to communicate with the agent 102 to control the operation of the agent 102 based on one or more predicted trajectories of the agent 102 and predicted trajectories of the one or more additional agents 202 that are traveling within the roadway environment 200. In one configuration, such control may be executed in the form of autonomous control of the agent 102 to maneuver through the roadway environment 200 without any overlap between the one or more predicted trajectories of the agent 102 and the predicted trajectories of one or more additional agents 202 traveling within the roadway environment 200.

In an exemplary embodiment, the agent 102 (that is configured a mechanical agent) may be configured to be include an electronic control unit (ECU) 114. The ECU 114 may be configured to execute one or more applications, operating systems, ego vehicle system and subsystem user interfaces, among others. In one or more embodiments, the ECU 114 may be configured to fully or partially execute the trajectory planning application 108. In one or more embodiments, the ECU 114 may include a microprocessor, one or more application-specific integrated circuit(s) (ASIC), or other similar devices. The ECU 114 may also include internal processing memory, an interface circuit, and bus lines for transferring data, sending commands, and communicating with the plurality of components of the agent 102.

The ECU 114 may additionally include a communication device (not shown) for sending data internally to components of (e.g., between one or more components) the agent 102 and communicating with externally hosted computing systems (e.g., external to the agent 102). The ECU 114 may be operably connected to an autonomous controller 116. In one embodiment, the ECU 114 may communicate with the autonomous controller 116 to execute autonomous operating commands to operate the agent 102 to be fully autonomously operated or semi-autonomously operated in a particular manner. As discussed below, the autonomous operating commands may be based on instructions that may be sent by the trajectory prediction application 108.

In particular, upon predicting the trajectory of the agent 102 and one or more additional agents that may be located within the roadway environment 200, the trajectory prediction application 108 may be configured to communicate one or more executable command instructions to the autonomous controller 116 of the agent 102. The one or more executable command instructions may pertain to particular vehicle dynamic parameters that may be followed to ensure that there is no overlap between the predicted trajectories of the agent 102 and the one or more additional agents 202 located within the roadway environment 200. Such vehicle dynamic parameters may include, but may not be limited to, a velocity, an acceleration rate, a braking rate, a steering/turning angle, and the like that may be implemented to autonomously or semi-autonomously operate the agent 102. Accordingly, the autonomous controller 116 may be configured to execute the one or more executable command instructions to operate the agent 102 to perform one or more maneuvers within the roadway environment 200 that may avoid any overlap between the predicted trajectories of the agent 102 and the one or more additional agents 202 located within the roadway environment 200.

In one or more embodiments, the autonomous controller 116 may be configured to control the operation of the agent 102 by providing one or more commands to one or more agent systems/control units 118 to provide fully autonomous or semi-autonomous control of the agent 102. The one or more agent systems/control units 118 may include but may not be limited to an engine control unit, a motor control unit, a braking control unit, a transmission control unit, a steering control unit, a turning control unit, and the like to control the agent 102 to autonomously/semi-autonomously operate within the roadway environment 200. In one configuration, the autonomous control of the agent 102 may be provided by sending one or more commands to control one or more of the agent systems/control units to operate the agent 102 during one or more circumstances (e.g., when providing operator assist controls), and/or to fully control operation of the agent 102 within the roadway environment 200.

In an exemplary embodiment, the agent 102 may include a communication unit 120. The communication unit 120 may be configured to connect to an internet cloud (not shown) to send and receive communication signals to and from the external server 106. The communication unit 120 may be configured to communicate through the internet cloud through one or more wireless communication signals that may include, but may not be limited to Bluetooth® signals, Wi-Fi signals, ZigBee signals, Wi-Max signals, and the like. In one embodiment, the communication unit 120 may be configured to connect to the internet cloud to send and receive communication signals to and from the agent 102 to one or more additional agents 202 located within the roadway environment 200.

With continued reference to FIG. 1, if the agent 102 is a pedestrian, bicyclist, and/or passenger that utilizes the portable device 104, the trajectory prediction application 108 may be configured to control the portable device 104 to present an alert user interface that may be configured to alert the agent 102 of potential overlap between the agent 102 and one or more agents that are located within the roadway environment 200. The potential overlap may be based on the predicted trajectories of the agent 102 and one or more additional agents 202 that are traveling within the roadway environment 200. In one configuration, the alert user interface may present an augmented overhead image of the roadway environment 200. The augmented overhead image may include images of the agent 102 and the one or more additional agents 202.

The augmented overhead image may also include one or more color-coded trajectory augmentations that may pertain to predicted trajectories of the agent 102 and the one or more additional agents 202 that are based on the predicted trajectories of the agent 102 and the one or more additional agents 202. The color-coded trajectory augmentations may be provided in selected colors that may indicate a warning level that by associated with overlap between one or more predicted trajectories of the agent 102 and respective predicted trajectories of one or more additional agents 202.

As an illustrative example, the color-coded trajectory augmentations may be provided as red, yellow, and green augmentations that may respectively indicate a high alert, a medium alert, and low alert with respect to a propensity of potential overlap between the one or more predicted trajectories of the agent 102 and the respective predicted trajectories of one or more additional agents 202. In some configurations, the alert user interface may also be associated with audio effects that may pertain to one or more levels of alerts associated with the potential overlap between the one or more predicted trajectories of the agent 102 and the respective predicted trajectories of one or more additional agents 202. This functionality may enable the agent 102 to change their respective trajectory to ensure that any overlap between one or more predicted trajectories of the agent 102 and the respective predicted trajectories of one or more additional agents 202 is avoided.

With particular reference to the external server 106, components of the external server 106 including the neural network 110 may be operably controlled by a processor 122. In one embodiment, the processor 122 may be operably connected to a memory 124 of the external server 106. The memory 124 may store one or more operating systems, applications, associated operating system data, application data, executable data, and the like. In one embodiment, the memory 124 may store the neural network 110. The processor 122 may be configured to access the memory 124 to operably control the neural network 110 to utilize machine learning/deep learning to provide artificial intelligence capabilities that may be utilized to provide an interpretable and unified representation for location prediction of the agent 102 and the one or more additional agents 202 traveling within the roadway environment 200.

In an exemplary embodiment, the neural network 110 may be configured as a convolutional neural network such as a long term short term memory neural network (LTSM) or gated recurrent units (GRU) that may be configured to classify, process, and make predictions based on time series data. In one embodiment, the neural network 110 may be trained at one or more time steps with data associated with novel unexplored current agent states and/or novel unexplored predicted agent states based on the plurality of simulations that are processed by a simulator (not shown).

In one embodiment, the processor 122 may be operably connected to a communication unit 126 of the external server 106. The communication unit 126 may be configured to connect to the internet cloud to send and receive communication signals between the external server 106, the RSE 112, the communication unit 120 of the agent 102, and/or the portable device 104 used by the agent 102. The communication unit 126 may be configured to communicate through the internet cloud through one or more wireless communication signals that may include, but may not be limited to Bluetooth® signals, Wi-Fi signals, ZigBee signals, Wi-Max signals, and the like. In one embodiment, the communication unit 126 may be configured to connect to the internet cloud to send and receive communication signals to and from external server 106 to the RSE 112, the agent 102, and/or one or more additional agents 202 that are located within the roadway environment 200.

In an exemplary embodiment, the trajectory prediction application 108 may be configured to utilize the communication unit 126 to receive data that is sent from the RSE 112. Such data may include birds-eye image data that may be communicated by the RSE 112 based on one or more birds-eye images that are captured by one or more cameras of the RSE 112. In one or more embodiments, upon the communication of birds-eye image data based on wireless signals received by the communication unit 126 of the external server 106, the processor 122 may be configured to communicate the birds-eye image data to the trajectory prediction application 108 to be further analyzed using the neural network 110.

In one configuration, upon receipt of the birds-eye image data by the trajectory prediction application 108, the application 108 may communicate with the neural network 110 to analyze the birds-eye image data. The neural network 110 may utilize a localization dataset 128 to annotate locational coordinates based on the analyzation of the birds-eye image data. In one configuration, the localization dataset 128 may be configured as a pre-trained dataset that is configured to store various forms of source data that may be associated with various types of roadway environments.

The localization dataset 128 may be pre-trained based on previously recorded image models that may be associated with various types of participant agents (e.g., additional vehicles, pedestrians, bicyclists, etc.) that may be located in various types of roadway environments. For example, the localization dataset 128 may be based on an extraction of hundreds/thousands of birds-eye image clips that include images of traffic environments that include participant agents. Each of the image clips may be annotated with roadway structural coordinates that are associated with fixed coordinates (x, y, z coordinates) that may pertain to the structure of one or more roadways of various types of roadway environments. Each of the image clips may also be annotated with agent trajectory coordinates that are associated with fixed coordinates (x, y coordinates) that may pertain to positions of various types of agents at one or more time steps within the various types of roadway environments.

In one configuration, the localization dataset 128 may also be pre-trained with classifiers that may be associated with birds-eye image data that may be based on annotations of roadway structures that may be associated with various roadway structural coordinates that are associated with various types of roadway environments. The classifiers may also be associated with birds-eye image data that may be based on annotations of agent actions that may be associated with agent trajectory coordinates. Such classifications may pertain to the location, direction, and/or speed of agents that may be traveling within various types of roadway environments based on pre-trained positions of agents.

In an exemplary embodiment, the neural network 110 may utilize the localization dataset 128 to analyze the structure of the roadway environment 200 and to determine the road structure that is associated with the structure of roadways of the roadway environment 200. The neural network 110 may also utilize the localization dataset 128 to analyze the location and direction of the agent 102 and one or more additional agents 202 as they travel within the roadway environment 200 to annotate the agent trajectory coordinates that are associated with the respective past trajectories of the agent 102 and the one or more additional agents 202 at one or more past time steps within the roadway environment 200. Such annotations may be utilized to determine potential fields that are associated with the structure of the roadway environment 200 and the past trajectory of the agent 102 and/or one or more additional agents 202 that are located within the roadway environment 200.

With particular reference to the RSE 112, the RSE 112 may include devices that are located at various locations within and surrounding the roadway environment 200. For example, the RSE 112 may be included as devices that are attached to one or more street lights, traffic lights, road signs, and the like that are located within one or more locations of the roadway environment 200. The RSE 112 may include a control unit 130 that may be configured to process and compute functions associated with the components of the RSE 112. The RSE 112 may additionally include a communication device 132 that may be configured communicate with one or more components of the system 100 and/or additional systems and components outside of the system 100 through the internet cloud. The communication device 132 of the RSE 112 may include, but is not limited to, one or more transceivers (not shown), one or more receivers (not shown), one or more transmitters (not shown), one or more antennas (not shown), and additional components (not shown) that may be used for wired and wireless computer connections and communications via various protocols, as discussed in detail above.

In one embodiment, upon capturing one or more bird-eye images of the roadway environment 200, the control unit 130 may be configured to process the one or more birds-eye images into birds-eye image data. The control unit 130 may be configured to utilize the communication device 132 of the RSE 112 to communicate the birds-eye image data to the external server 106 to be received by the trajectory prediction application 108 and to be thereby analyzed by the neural network 110.

II. The Roadway Agent Trajectory Prediction Application and Related Methods

Components of the trajectory prediction application 108 will now be described according to an exemplary embodiment and with reference to FIG. 1. In an exemplary embodiment, the trajectory prediction application 108 may be stored on the memory 124 of the external server 106 and executed by the processor 122 of the external server 106. In another embodiment, the trajectory prediction application 108 (e.g., executable files) may be accessed by the communication unit 120 of the agent 102 through the communication unit 126 of the external server 106 and may be executed by the ECU 114 of the agent 102. In an alternate embodiment, the trajectory prediction application 108 may be additionally or alternatively accessed by the communication device 132 of the RSE 112 and may be executed by the control unit 130 of the RSE 112. The trajectory prediction application 108 may also be accessed through the portable device 104 used by the agent 102 through wireless connectivity with the internet cloud.

Figure 3:
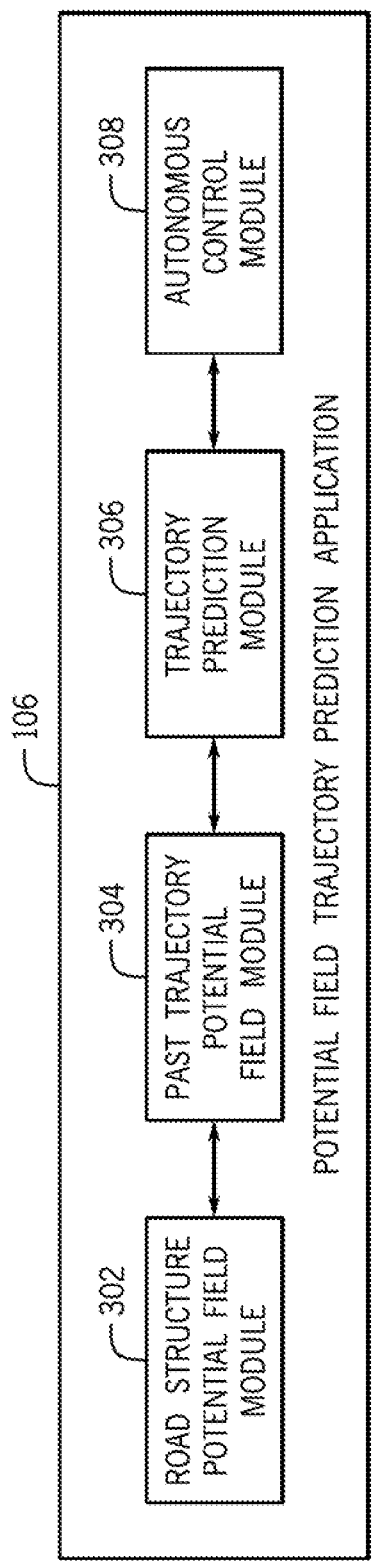
FIG. 3 is a schematic overview of a plurality of modules of a trajectory prediction application that may be configured to provide an interpretable and unified representation for trajectory prediction according to an exemplary embodiment of the present disclosure.

The general functionality of trajectory prediction application 108 will now be discussed. FIG. 3 is a schematic overview of a plurality of modules 302-308 of the trajectory prediction application 108 that may be configured to provide an interpretable and unified representation for trajectory prediction according to an exemplary embodiment of the present disclosure. The plurality of modules 302-308 may include a road structure potential field module 302, a past trajectory potential field module 304, a trajectory prediction module 306, and an autonomous control module 308. However, it is appreciated that the trajectory prediction application 108 may include one or more additional modules and/or sub-modules that are included in lieu of the modules 302-308.

Figure 4:
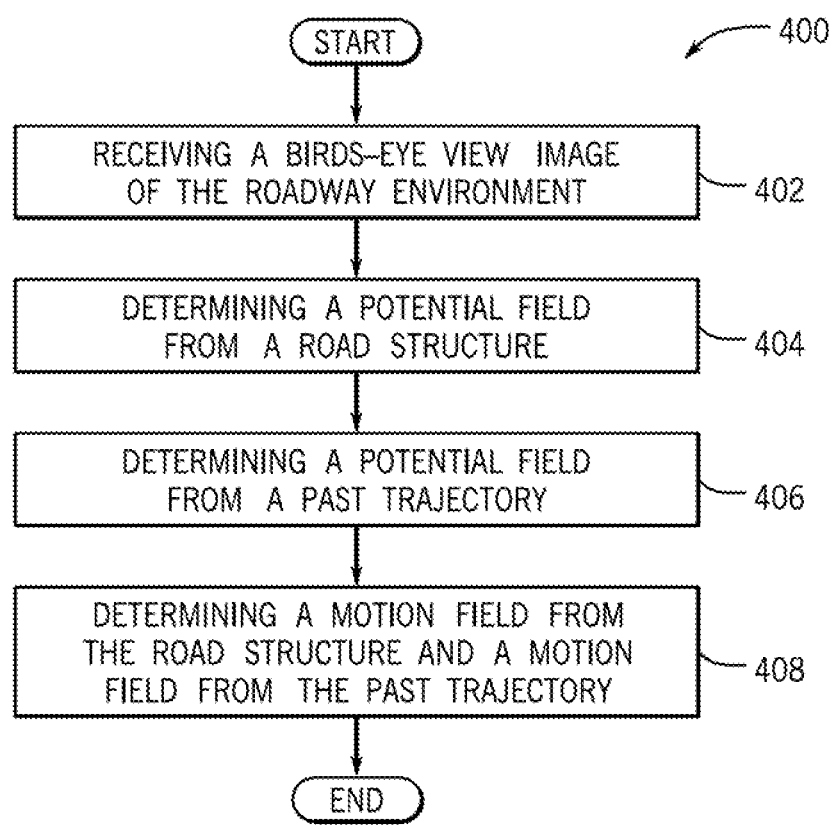
FIG. 4 is a process flow diagram of a method for determining motion fields associated with a structure of the roadway environment and a past trajectory of the agent according to an exemplary embodiment of the present disclosure.

FIG. 4 is a process flow diagram of a method 400 for determining motion fields associated with the structure of the roadway environment 200 and the past trajectory of the agent 102 according to an exemplary embodiment of the present disclosure. FIG. 4 will be described with reference to the components of FIG. 1, FIG. 2A and FIG. 2B, though it is to be appreciated that the method 400 of FIG. 4 may be used with other systems/components. The method 400 may begin at block 402, wherein the method 400 may include receiving a birds-eye view image of the roadway environment 200.

In an exemplary embodiment, the road structure potential field module 302 may be configured to receive birds-eye image data communicated from the RSE 112 based on a birds-eye image of the roadway environment 200 captured by the one or more cameras of the RSE 112. The birds-eye image may be captured as an overhead view of the roadway environment 200. With reference to the illustrative framework 600 of FIG. 6, in one embodiment, the road structure potential field module 302 may define the birds-eye image 602 associated with the birds-eye image data as a scalar value that represents the potential energy associated with potential directions of travel of the agent 102 and the one or more additional agents 202 located within the roadway environment 200. The road structure potential field module 302 may define the input road structure image captured from a bird-eye view perspective as $\mathcal{J} \in \mathbb{R}^{W \times H \times C}$, where W and H is the width and height of the image and C is the number of channels.

The method 400 may proceed to block 404, wherein the method 400 may include determining a potential field associated with the roadway structure. In an exemplary embodiment, the road structure potential field module 302 may be configured to pass the birds-eye image data to the neural network 110. The neural network 110 may be configured to access the localization dataset 128 to compare roadway structural information determined from the birds-eye image data to classify the structural configuration (e.g., angles of turns, types of roadways, etc.) of the roadway environment 200.

Figure 6:
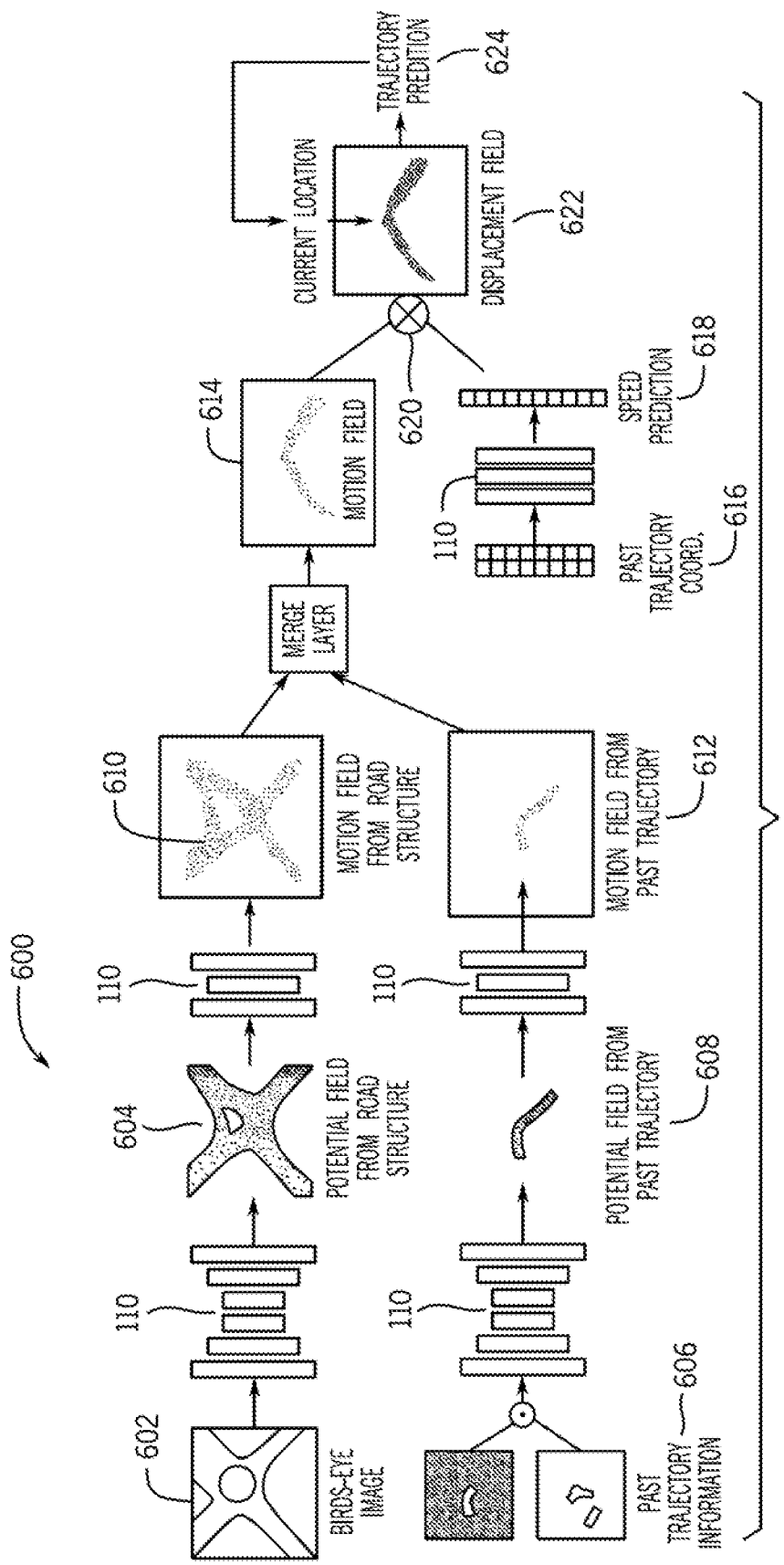
FIG. 6 is an illustrative framework of process steps executed by the trajectory prediction application according to an exemplary embodiment of the present disclosure.

With continued reference to FIG. 4 and FIG. 6, the neural network 110 may output a potential field 604 from road structure that is associated with the structure of the roadway environment 200. The potential field 604 may be included as roadway trajectories that are classified based on trained data retrieved from the localization dataset 128. In one configuration, the road structure potential field module 302 may thereby determine the potential field for each roadway trajectory. The road structure potential field module 302 may be configured to merge a plurality of potential fields of each roadway trajectory of each roadway included within the roadway environment 200 to thereby determine the potential field 604 from the road structure. The potential field 604 may be configured as a ground truth potential field for the roadway environment 200.

The potential field 604 may be indicative of pixel values that are assigned to each of a plurality of pixels of the birds-eye image of the roadway environment 200. The potential field 604 from road structure associated with the structure of the roadway environment 200 may indicate pathways that may be followed by the agent 102 and one more additional agents 202. As discussed below, the road structure potential field module 302 may include a scalar value that represents the potential energy of the agent 102 and one or more additional agents 202 that is based on expected traveling of the agents 102, 202 to areas of the roadway environment 200 that are associated with higher potential field pixel values to lower potential field pixel values.

The road structure potential field module 302 may be configured to generate the ground truth potential field from a single trajectory. Given three adjacent points $x_i$, $x_{i+1}$, and $x_{i+2}$ on a trajectory $X_{full}$, their corresponding potential values are denoted as $p(x_i)$, $p(x_{i+1})$ and $p(x_{i+2})$. It is assumed that the velocity within a pair of adjacent sampled positions is constant. Therefore, the velocity within two points $(x_i, x_{i+1})$ is given as:

$$v_i + \frac{\|x_{i+1} - x_i\|_2}{\delta t} = \frac{d_i}{\delta t},$$

where $\delta t$ is the sampling interval. The velocity may be different for other segment regions in the same trajectory. The module 302 is configured denote the potential difference between two points $(x_i, x_{i+1})$ as $\delta p_i = p(x_i) - p(x_{i+1})$.

Similar to the constant velocity assumption, the module 302 operates with an assumption that the derivative of the potential energy is constant from $x_i$ to $x_{i+1}$. The field strength is then denoted as $\xi_i = \delta p_i / d_i$. The road structure potential field module 302 may define a potential energy difference directly to the velocity of the agent 102 and one or more additional agents 202 that are located within the roadway environment 200. The velocity may be formulated as:

$$v_j = \alpha \varepsilon_j = \alpha \frac{p(x_j) - p(x_{j+1})}{d_j},$$

where $\alpha$ is a constant scaling factor that depends on the types and intrinsic properties of the agents 102, 202, which is similar to mass or electric charge of objects in a potential field electricity theory.

In one embodiment, the relationship among $p(x_i)$, $p(x_{i+1})$ and $p(x_{i+2})$ is derived as:

$$\frac{p(x_i) - p(x_{i+1})}{p(x_{i+1}) - p(x_{i+2})} = \frac{d_i^2}{d_{i+1}^2}.$$

The constant velocity and uniform field strength assumption requires the three points to be adjacently sampled. The relationship among $p(x_i)$, $p(x_{i+i})$ and $p(x_{i+2})$ is further generalized to potential values among any triplets $(x_i, x_j, x_k)$ on the same trajectory and is defined as follows:

$$\frac{p(x_i) - p(x_j)}{p(x_j) - p(x_k)} = \frac{\sum_{r=i}^{j-1} d_r^2}{\sum_{r=j}^{k-1} d_r^2},$$

where $1 \leq i < j < k \leq n$. If we further constrain that $p(x_1) = +1$ and $p(x_n) = -1$ on this trajectory, $p(x_i)$ for points $\forall x_i \in X_{full}$ may be calculated as $$P(x_i) = \frac{\sum_{r=i}^{t-1} d_r^2 - \sum_{r=1}^{i-1} d_r^2}{\sum_{r=1}^{n-1} d_r^2}.$$

In one or more embodiments, given a single trajectory $X_{full}$ and the corresponding potential values $p(x_i)$ for points $\forall x_i \in X_{full}$, the module 302 may generate a dense potential field $\mathcal{P}x$. The potential value for each pixel location is calculated and converted to be an image $\mathcal{P}x \in \mathbb{R}^{W \times H}$ which represents the ground truth potential field. The notation $\mathcal{P}$ will be used as the generated ground truth potential field, and $\hat{\mathcal{P}}$ as the estimated potential field within this disclosure.

$$\mathcal{P}_X(u, v) = \begin{cases} \frac{p(x_i) d_{i+1}^{\|} + p(x_{i+1}) d_i^{\|}}{d_i} & \text{if } d_i^{\perp} < w \\ 0 & \text{if } d_i^{\perp} > w \text{ for all } 1 \leq i < n \end{cases}$$

where $$d_i^{\|} = ((u, v) - x_i) \cdot \frac{x_{i+1} - x_i}{\|x_{i+1} - x_i\|}, \quad d_{i+1}^{\|} = ((u, v) - x_{i+1}) \cdot \frac{x_\tau - x_{i+1}}{\|x_{i+1} - x_2\|}$$

with · being dot product, and $d_i^{\perp}$ is the distance from pixel $(u, v)$ to a segment $(x_i, x_{i+1})$.

In one embodiment, each pixel of the birds-eye image may be assigned potential fields pixel values as a scalar value that represents a potential energy that represents locations at which the agent's motion is generated towards. The agent's motion is therefore generated towards lower potential energy locations that are determined based on pixels of the birds-eye image of the roadway environment 200 that include lower potential field pixel values.

In particular, the road structure potential field module 302 may thereby collect the trajectories associated with the structure of roadways within the roadway environment 200 from the agent 102 and the one or more additional agents 202 located within the roadway environment 200. Each of the trajectories may be denoted as $\mathbb{J}_J \{X_{full}^s | s = 1, \ldots, N\}$ as a set of trajectories from different agents 102, 202 s who travel within the roadway environment 200 $\mathcal{J}$. For each trajectory $X_{fidReject}^s$ of the agent 102 and each of the one or more additional agents 202 located within the roadway environment 200, the module 302 may compute the ground truth dense potential field $\mathcal{P} x_{fidReject}^s$.

The localization dataset 128 of the neural network 110 may be pre-trained to estimate $\hat{\mathcal{P}}_J$ using a bird-eye view image $\mathcal{J}$ as follows: $\hat{\mathcal{P}}_J = \text{Reject}(\mathcal{J}, \Theta_J)$, where $\kappa(\cdot)$: $\mathbb{R}^{W \times H \times C} \to \mathbb{R}^{W \times H}$ and $\Theta_J$ is a set of trainable variables. The loss function to estimate $\hat{\mathcal{P}}_J$ from a set of trajectories $\mathbb{J}_J$ is given as:

$$\mathcal{L}_J = \frac{1}{N} \sum_{s=1}^{N} \| \mathcal{M}_{X_{full}^s} \cdot [\mathcal{P}_{X_{full}^s} - \hat{\mathcal{P}}_j], \|$$

where $\mathcal{M} x_{full}^s \in \mathbb{R}^{W \times H}$ is a pixel-wise mask that acts as a soft indicator function for trajectory $X_{full}^s$ given by:

$$\mathcal{M}_{X_{full}^s}(u, v) = \begin{cases} 1 & \text{if } \mathcal{P}_{X_{full}^s}(u, v) \neq 0, 1 \leq s \leq N \\ \lambda & \text{if } \mathcal{P}_{X_{full}^s}(u, v) = 0, 1 \leq s \leq N \end{cases}$$

where $\lambda < 1$ is a weight parameter. The loss function enforces $\hat{\mathcal{P}}_J$ to be consistent with different ground truth trajectories $\mathcal{P} x_{full}^s$ in the scene, while having a regularization part for the region where none of the agents 102, 202 travel. Accordingly, the potential field 604 from road structure may pertain to the influence of the roadway environment 200 on the motion behavior of the agent 102 and the one or more agents 202 located within the roadway environment 200, which corresponds to the environmental stimuli. In other words, the potential field 604 pertains to a constraint on the future motions of the agent 102 and the one or more additional agents 202 located within the roadway environment 200 based on movable/drivable area of the roadways of the roadway environment 200.

With continued reference to FIG. 4, the method 400 may proceed to block 406, wherein the method 400 may include determining a potential field 608 from past trajectory. In an exemplary embodiment, the past trajectory potential field module 304 of the trajectory prediction application 108 may be configured to analyze the birds-eye image data associated with the birds-eye image 602 and determine past trajectory information 606 associated with the past trajectory (e.g., at one or more past time stamps; t−1, t−2, t−3, t−n) of the agent 102 and the one or more additional agents 202 located within the roadway environment 200. In one configuration, the trajectory prediction application 108 may be configured to annotate the birds-eye image data associated with a birds-eye image clip with agent trajectory coordinates that are associated with fixed coordinates (x, y coordinates) that may pertain to positions of the agent 102 and the one or more additional agents 202 at one or more past time steps.

In an exemplary embodiment, upon determining agent trajectory coordinates associated with the agent 102 and the one or more agents 202, the past trajectory potential field module 304 may be configured to pass the agent trajectory coordinates to the neural network 110 to process a potential field 608 from past trajectory. In an exemplary, the potential field 608 from past trajectory will be determined based on cropping of the birds-eye image of the roadway environment 200 at the respective current trajectory locations of the agent 102 and the one or more additional agents 202 at a predetermined size. Accordingly, the past trajectory of the agent 102 and the past trajectories of the one or more additional agents 202 that are neighboring the agent 102 within the roadway environment 200 may be quantified.

More specifically, from the past motion information that includes the agent trajectory coordinates that are associated with fixed coordinates that may pertain to positions of the agent 102 and the one or more additional agents 202 at one or more past time steps, the past trajectory potential field module 304 may generate the potential field 608 from past trajectory to encode inertial effect and social effect. For the agent 102 $k$'s past trajectory $X_{past}^k = \{x_\tau^k | \tau=1, \ldots, t\}$, the module 304 defines a set of neighbor's past trajectories associated with the one or more additional agents 202 as $J_{near}^k = \{X_{past}^c \| \|x_t^c - x_t^k\| \le r\}$, where r is a pre-defined radius. The potential field for the agent 102 $k$ is generated from its past trajectory $X_{past}^k$ and trajectories of the one or more agents 202 $J_{near}^k$ using $$\hat{\mathcal{P}}_{X_{full}^k} = \varphi(X_{past}^k, \mathcal{P}_{J_{near}^k}, \theta_X),$$

where $\varphi(\cdot)$ takes the input from both the agent's past trajectory $X_{past}^k$ and the one or more additional agents past trajectories $J_{near}^k$, $\mathcal{P}_J = \Sigma_{x \in J} \mathcal{P}x$ is the sum of ground truth dense potential field (generated from Eq.) in the set $J_{near}^k$, and $\theta_X$ is a set of trainable variables.

Accordingly, the potential field 608 from the past trajectory is compatible with the behavior of the agent 102 and also considers the social interactions among the agent 102 and the one or more additional agents 202 located nearby the agent 102 within the surrounding roadway environment 200. As an illustrative example, a generated potential field may indicate a distribution of potential motions given the respective past trajectories of the agent 102 and one or more additional agents 202 located within the roadway environment 200. The potential field 608 may pertain to a modal nature of future prediction that is based on a social effect that is shown based on one or more potential trajectories of the agent 102 that may be eliminated by the interactions with one or more additional agents 202 that are traveling in a similar velocities to a velocity of the agent 102.

With continued reference to the method 400 of FIG. 4 and the framework 600 of FIG. 6, upon determining the potential field 608, the method 400 may proceed to block 408 wherein the method 400 may include determining a motion field 610 from the road structure and a motion field 612 from the past trajectory. In an exemplary embodiment, upon determining the potential field 604 from the road structure and the potential field 608 from the past trajectory, the road structure potential field module 302 and the past trajectory potential field module 304 may respectively communicate data associated with the respective potential fields 604, 608 to the trajectory prediction module 306 of the trajectory prediction application 108.

In an exemplary, the trajectory prediction module 306 may be configured to pass the potential fields 604, 608 through the neural network 110 to determine respective motion fields 610, 612. In particular, the neural network 110 may utilize the localization dataset 128 to output a motion field 610 from the road structure and a motion field 612 from the past trajectory. The motion fields 610, 612 will provide pixel values for each pixel associated with the birds-eye image of the roadway environment 200. For example, the pixel values may include vector values that pertain to the directional structure of particular roadways of the roadway environment 200 that may be followed by the agent 102 and the one or more additional agents 202 while traveling through the roadway environment 200. The pixel values may also include vector values that pertain to the directional past trajectories of the agent 102 and the one or more agents 202 while traveling through the roadway environment 200.

In particular, since the potential fields 604, 608 are a universal representation of the roadway structures and directional trajectories, the neural network 110 accordingly is configured to estimate future motion direction and speed independently associated with the agent 102 and the one or more agents 202 traveling within the roadway environment 200. In one embodiment, the expected direction of the future motion is derived from the potential field as:

$$V(\mathcal{J}) = \zeta(\mathcal{J}, \theta_{v,\mathcal{J}}) = E\left[\frac{\partial \hat{\mathcal{P}}_\mathcal{J}}{\partial(u, v)} \Big/ \|\frac{\partial \hat{\mathcal{P}}_\mathcal{J}}{\partial(u, v)}\|\right] \quad (11) \quad V(X) = \zeta(X, \theta_{v,x}) = E\left[\frac{\partial \hat{\mathcal{P}}_X}{\partial(u, v)} \Big/ \|\frac{\partial \hat{\mathcal{P}}_X}{\partial(u, v)}\|\right]$$

where $\zeta(\cdot): \mathbb{R}^{W \times H} \to \mathbb{R}^{W \times H}$ with $\theta_{v,\mathcal{J}}$ and $\theta_{v,x}$ being the learnable parameters. E[·] is the expected values.

Figure 5:
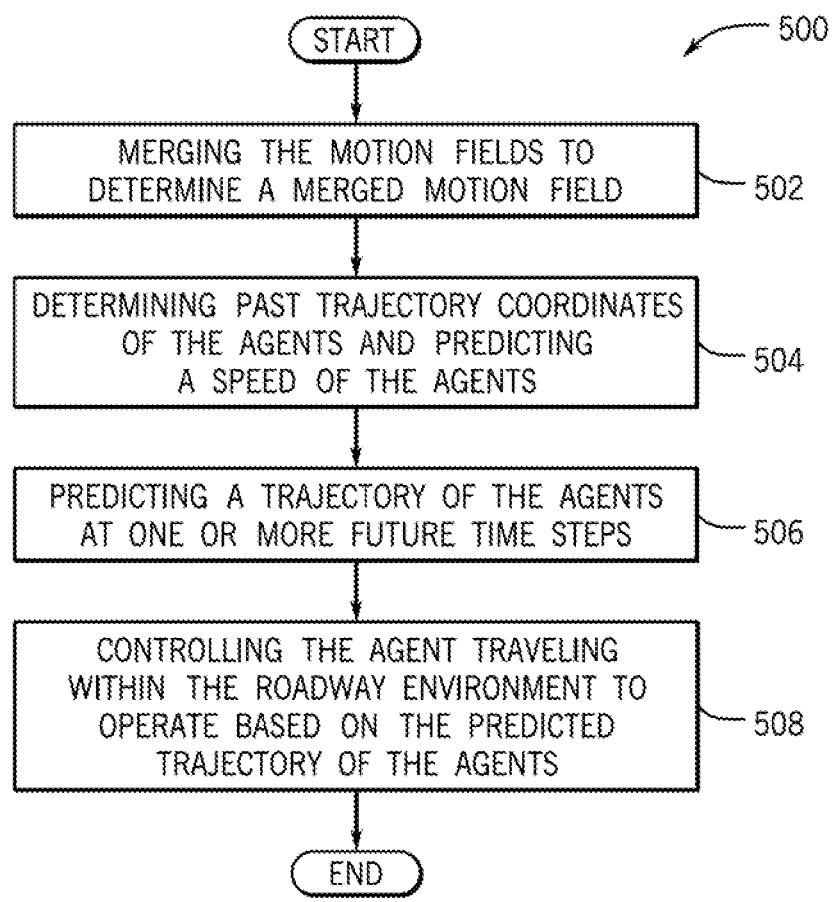
FIG. 5 is a process flow diagram associated with a method for predicting trajectories of agents and controlling one or more agents to operate based on the predicted future trajectories of agents according to an exemplary embodiment of the present disclosure.

FIG. 5 is a process flow diagram associated with a method 500 for predicting trajectories of agents 102, 202 and controlling one or more agents 102, 202 to operate based on the predicted future trajectories of agents 102, 202 according to an exemplary embodiment of the present disclosure. FIG. 5 will be described with reference to the components of FIG. 1, FIG. 2A and FIG. 2B, though it is to be appreciated that the method 500 of FIG. 5 may be used with other systems/components. The method 500 may begin with block 502, wherein the method 500 may include merging the motion fields 610, 612 to determine a merged motion field 614.

With reference to FIG. 6, in an exemplary embodiment, upon receiving the output of the neural network 110 of the motion field 610 from the road structure and the motion field 612 from the past trajectory, the trajectory prediction module 306 may be configured to merge the motion fields 610, 612 by concatenating data associated with both of the motion fields 610, 612. The trajectory prediction module 306 may concatenate the motion field 610 from road structure and the motion field 612 from past trajectory using a pixel-wise mask. The mask may be generated by the neural network 110 and weighting may be used since the motion fields 610, 612 may have concrete meanings of motion direction (e.g., for each pixel an assigned value may be between 0 and 1).

The trajectory prediction module 306 may thereby process and determine a merged motion field 614 that will provide directional constraints of the agent 102 and the one or more agents 202 based on both roadway structural constraints derived from the structure of the roadway environment 200 and directional trajectory constraints derived from the past trajectories of the agent 102 and the one or more additional agents 202 included within the motion fields 610, 612. $V(\mathcal{I})$ and $V(X)$ are the effects of three independent stimuli on the agent 102. In one configuration, following the addictive property of force, the trajectory prediction module 306 concatenates the two motion fields 610, 612 with a weighted sum by $V(\mathcal{I},X)=\mathcal{Y} \cdot V(X)+(1-\mathcal{Y}) \cdot V(\mathcal{I})$ where $\mathcal{Y} = \chi(V_X, V_\mathcal{I})$ is a pixel-wise weighting mask determined by the motion fields 610, 612.

With continued reference to FIG. 5 and FIG. 6, the method 500 may proceed to block 504, wherein the method 500 may include determining past trajectory coordinates of the agents 102, 202 and predicting a speed of the agents 102, 202. In an exemplary embodiment, the trajectory prediction module 306 may be configured to determine past trajectory coordinates 616 as fixed coordinates (x, y coordinates) that may pertain to a trajectory, locations, and directions of the agent 102 and the one or more additional agents 202 at the past time steps as captured within the motion field 612 from the past trajectory. Upon determining the past trajectory coordinates 616 associated with one or more past time steps, the trajectory prediction module 306 may be configured to pass the past trajectory coordinates 616 to the neural network 110 to be analyzed to process speed prediction 618 associated with a predicted speed of the agent 102 and the predicted speed of one or more additional agents 202 based on the motion field 612 from the past trajectory.

In one embodiment, the expected speed of the future motion is derived from the past trajectory by $S=\psi(X_{past},\theta_\psi)$ where $\psi(\cdot): \mathbb{R}^{t \times s} \to \mathbb{R}^{(n-t)}$, n is the length of the whole trajectory and t is the length of the past trajectory. In an exemplary embodiment, the trajectory prediction module 306 may model the functions $\zeta(\cdot)$ and $\psi(\cdot)$ using the neural network 110. In addition to mean values of the distributions, the neural network 110 may output the variance of the distributions. The ground truth of the motion direction and speed is thereby calculated from the trajectory data. The loss function then enforces the neural network 110 to generate distributions of $\mathcal{N}(V,\Sigma_v)$, $\mathcal{N}(S,\Sigma_S)$. More specifically, the neural network 110 is configured to output an estimation of the maximum likelihood of the ground truth samples given the generated mean and sigma values, and the loss is given by $$\mathcal{L}_v = -\sum_i \log P\left(\frac{v_i}{|v_i|} \Big| \mathcal{N}(V(x_i), \Sigma_v(x_i))\right)$$

-continued $$\mathcal{L}_S = -\sum_i \log P(|v_i| \| \mathcal{N}(S(\tau), \Sigma_S(\tau)))$$

where $v_i$ is the velocity of an agent at location $x_i$ at time $\tau$.

With continued reference to FIG. 5 and FIG. 6, upon predicting a speed of the agents 102, 202, the method 500 may proceed to block 506, wherein the method 500 may include predicting a trajectory of the agents 102, 202 at one or more future time steps. In an exemplary embodiment, upon the neural network 110 outputting the speed prediction 618 associated with the agent 102 and the one or more additional agents 102 traveling within the roadway environment 200, the trajectory prediction module 306 may be configured to perform a multiplication operation 620 to multiply the merged motion field 614 with the speed prediction 618 associated with the future motion of the agent 102 and the one or more additional agents 202 to thereby output a displacement field 622.

In an exemplary embodiment, the trajectory prediction module 306 may be configured to analyze the displacement field 622 as a displacement of direction of the agent 102 and the one or more additional agents 202. As the merged motion field 614 indicates the motion based on the roadway structural constraints and trajectory constraints the agent 102 and the one or more additional agents 202, and the speed prediction 618 indicates the predicted speeds of the agent 102 and the one or more additional agents 202, the displacement field 622 may multiply the two indications. The output of the multiplication of the two indications may thereby indicate trajectory prediction 624 of the agent 102 and the one or more additional agents 202 based on a direction of movement as determined based on the past trajectories and a length of movement based on the speeds within the roadway environment 200 at one or more future time steps. In one configuration, the displacement field 622 may be applied recurrently at one or more current time steps to determine a trajectory prediction 624 for one or more future time steps that is associated with future trajectories of the agent 102 and the one or more agents 202 traveling within the roadway environment 200. In other words, the predicted direction and speed of motion of the agent 102 and the one or more additional agents 202 that are traveling within the roadway environment 200 are modeled to generate respective future trajectories by recurrently moving a past location on a displacement field.

In one embodiment, for single future prediction, mean values V for motion direction and S for speed are used to generate displacement field as follows: $\mathcal{D}_\tau = V \cdot S(\tau)$, where $\mathcal{D}_\tau \in \mathbb{R}^{W \times H \times 2}$ is a vector field with scale and $\tau \in \{t, t+1, n-1\}$ is a desired prediction time. The displacement field set $\mathcal{D} = \{\mathcal{D}_{t+1}, \mathcal{D}_{t+2}, \mathcal{D}_n\}$ a provides the complete motion of each pixel at every time step. The trajectory prediction may thereby be given by recurrently moving and updating the previous location $x_\tau$ by $x_{\tau+1} = x_\tau + \mathcal{D}_\tau(x_\tau)$, where $t \leq \tau < n$.

In some embodiments, for multi-modal future prediction, the trajectory prediction module 306 may sample instances $V^j$ for motion direction and $S^j$ for speed from the distribution $\mathcal{N}(V,\Sigma_v)$ and $\mathcal{N}(S,\Sigma_S)$, respectively, and generate displacement field $D_\tau^j = V^j \cdot S^j(\tau)$, where $t \leq \tau < n$ and $1 \leq j \leq K$ is the prediction index with K being the number of generated predictions. The predicted trajectories are then generated by recurrently applying $\mathcal{D}_\tau^j$ from the previous location $x_\tau$ by $x_{\tau+1}^j = x_\tau^j + \mathcal{D}_\tau^j(x_\tau)$.

With continued reference to the method 500 of FIG. 5, upon predicting the location of the agent 102 and the one or more additional agents 202, the method 500 may proceed to block 508, wherein the method 500 may include controlling the agent 102 to operate based on the predicted trajectories of the agents 102, 202. In an exemplary embodiment, upon completing the trajectory prediction 624 of the agent 102 and the one or more additional agents 202 traveling within the roadway environment 200 at one or more future time steps, the trajectory prediction module 306 may be configured to communicate respective data pertaining to the one or more predicted trajectories of the agents 102, 202 to the autonomous control module 308 of the trajectory prediction application 108.

In an exemplary embodiment, the autonomous control module 308 may be configured to analyze the predicted trajectories of the agent 102 and the one or more additional agents 202 and determine one or more travel pathways that are associated with each of agent 102 that may be implemented to avoid any overlap with the predicted trajectories of the one or more additional agents 202 as they travel within the roadway environment 200 at one or more future time steps. In one embodiment, if the agent 102 is configured as a mechanical agent, the autonomous control module 308 may thereby communicate data pertaining to the one or more travel pathways associated with the agent 102 to the ECU 114 of the agent 102 to autonomously control the agent 102 to operate in a manner that follows one of the travel pathways. In particular, upon the autonomous control module 308 communicating the data pertaining to the one or more travel pathways, the ECU 114 may communicate with the agent systems/control units 118 to autonomously control the agent 102 to be autonomously (or semi-autonomously) operated (e.g., driven) within the roadway environment 200 to follow one of the travel paths at one or more future time steps.

In particular, the ECU 114 may communicate with the agent systems/control units 118 to thereby control the agent 102 to perform one or more maneuvers to travel to predicted locations of the roadway environment 200 at a respective speed, braking rate, steering rate, acceleration rate, and the like that avoids overlap with respect to the predicted trajectories of the one or more additional agents 202 at one or more future time steps. Additionally, the ECU 114 may communicate with the agent systems/control units 118 to thereby control the agent 102 to perform one or more maneuvers to travel to predicted locations of the roadway environment 200 at a respective speed, braking rate, steering rate, acceleration rate, and the like that avoids overlap with static objects and in accordance with the environmental attributes (e.g., type of roadway, number of lanes, navigable pathways) associated with the roadway environment 200.

Figure 7:
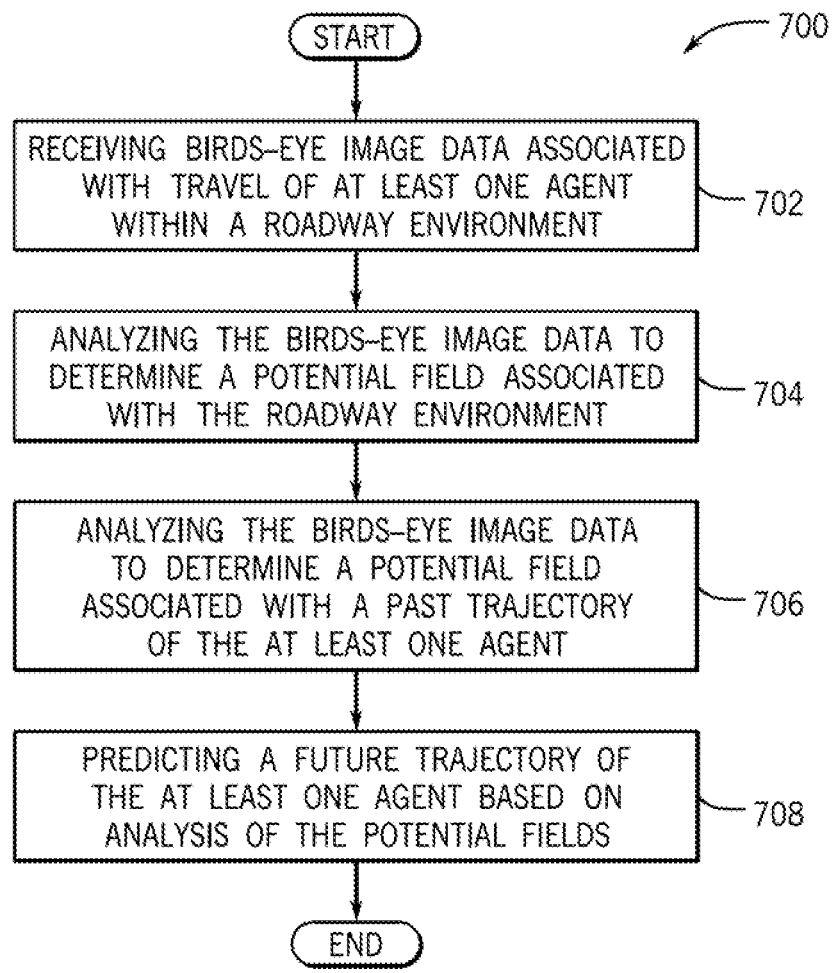
FIG. 7 is a process flow diagram of a method for providing an interpretable and unified representation for trajectory prediction according to an exemplary embodiment of the present disclosure.

FIG. 7 is a process flow diagram of a method 700 for providing an interpretable and unified representation for trajectory prediction according to an exemplary embodiment of the present disclosure. FIG. 7 will be described with reference to the components of FIG. 1, FIG. 2A, FIG. 2B, and FIG. 6 though it is to be appreciated that the method 700 of FIG. 7 may be used with other systems/components. The method 700 of FIG. 7 may begin at block 702, wherein the method 700 may include receiving birds-eye image data associated with travel of at least one agent 102 within a roadway environment 200.

The method 700 may proceed to block 704, wherein the method 700 may include analyzing the birds-eye image data to determine a potential field 604 associated with the roadway environment 200. The method 700 may proceed to block 706 wherein the method 700 may include analyzing the birds-eye image data to determine a potential field associated with a past trajectory of the at least one agent 102. The method 700 may proceed to block 708, wherein the method 700 may include predicting a future trajectory of the at least one agent 102 based on analysis of the potential fields. In one embodiment, the predicted direction and a predicted speed of motion of the at least one agent within the roadway environment are modeled to generate the future trajectory by recurrently moving past location on a displacement field.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing an interpretable and unified representation for trajectory prediction, comprising:
   receiving birds-eye image data associated with travel of at least one agent within a roadway environment;
   analyzing the birds-eye image data to determine a potential field associated with the roadway environment;
   analyzing the birds-eye image data to determine a potential field associated with a past trajectory of the at least one agent; and
   predicting a future trajectory of the at least one agent based on analysis of the potential fields, wherein a predicted direction and a predicted speed of motion of the at least one agent within the roadway environment are modeled to generate the future trajectory by recurrently moving past a location on a displacement field.

2. The computer-implemented method of claim 1, wherein receiving the birds-eye image data includes communicating with a road-side equipment to receive the birds-eye image data, wherein the birds-eye image data is associated with at least one birds-eye image of the roadway environment captured by at least one camera of the road-side equipment.

3. The computer-implemented method of claim 2, wherein analyzing the birds-eye image data to determine the potential field associated with the roadway environment includes assigning each pixel of the at least one birds-eye image with a potential field pixel value, wherein the potential field pixel value is a scalar value that represents a potential energy that represents locations at which motion of the at least one agent is generated towards based on a road structure of the roadway environment.

4. The computer-implemented method of claim 2, wherein analyzing the birds-eye image data to determine the potential field associated with the past trajectory of the at least one agent includes analyzing past motion information that includes agent trajectory coordinates that are associated with fixed coordinates that pertain to positions of the at least one agent during at least one past time step, wherein the potential field associated with the past trajectory is analyzed to encode an inertial effect and a social effect on a travel of the at least one agent within the roadway environment.

5. The computer-implemented method of claim 2, further including determining a motion field from the road structure of the roadway environment and a motion field from the past trajectory of the at least one agent based on the potential field associated with the roadway environment and the potential field associated with the past trajectory of the at least one agent.

6. The computer-implemented method of claim 5, wherein the motion field from the road structure includes pixel values of the at least one birds-eye image that include vector values that pertain to a directional structure of roadways of the roadway environment, wherein the motion field from the past trajectory of the at least one agent includes pixel values that include vector values that pertain to a past direction of the at least one agent.

7. The computer-implemented method of claim 5, further including merging the motion field from the road structure and the motion field from the past trajectory, wherein the motion fields are merged into a merged motion field that indicates future motion constraints of the at least one agent traveling within the roadway environment that are based on roadway structural constraints and trajectory constraints.

8. The computer-implemented method of claim 7, further including outputting the predicted speed of motion of the at least one agent based on past trajectory lengths associated with the past trajectory of the at least one agent at a plurality of past time steps.

9. The computer-implemented method of claim 8, wherein predicting the future trajectory of the at least one agent includes multiplying the merged motion field with the predicted speed of motion of the at least one agent to determine the displacement field, wherein the displacement field indicates trajectory prediction of the at least one agent based on the predicted direction as determined based on the past trajectory and a length of movement based on the predicted speed of motion within the roadway environment during at least one future time step.

10. A system for providing an interpretable and unified representation for trajectory prediction, comprising:
a memory storing instructions when executed by a processor cause the processor to:
receive birds-eye image data associated with travel of at least one agent within a roadway environment;
analyze the birds-eye image data to determine a potential field associated with the roadway environment;
analyze the birds-eye image data to determine a potential field associated with a past trajectory of the at least one agent; and
predict a future trajectory of the at least one agent based on analysis of the potential fields, wherein a predicted direction and a predicted speed of motion of the at least one agent within the roadway environment are modeled to generate the future trajectory by recurrently moving past a location on a displacement field.

11. The system of claim 10, wherein receiving the birds-eye image data includes communicating with a road-side equipment to receive the birds-eye image data, wherein the birds-eye image data is associated with at least one birds-eye image of the roadway environment captured by at least one camera of the road-side equipment.

12. The system of claim 11, wherein analyzing the birds-eye image data to determine the potential field associated with the roadway environment includes assigning each pixel of the at least one birds-eye image with a potential field pixel value, wherein the potential field pixel value is a scalar value that represents a potential energy that represents locations at which motion of the at least one agent is generated towards based on a road structure of the roadway environment.

13. The system of claim 11, wherein analyzing the birds-eye image data to determine the potential field associated with the past trajectory of the at least one agent includes analyzing past motion information that includes agent trajectory coordinates that are associated with fixed coordinates that pertain to positions of the at least one agent during at least one past time step, wherein the potential field associated with the past trajectory is analyzed to encode an inertial effect and a social effect on a travel of the at least one agent within the roadway environment.

14. The system of claim 11, further including determining a motion field from the road structure of the roadway environment and a motion field from the past trajectory of the at least one agent based on the potential field associated with the roadway environment and the potential field associated with the past trajectory of the at least one agent.

15. The system of claim 14, wherein the motion field from the road structure includes pixel values of the at least one birds-eye image that include vector values that pertain to a directional structure of roadways of the roadway environment, wherein the motion field from the past trajectory of the at least one agent includes pixel values that include vector values that pertain to a past direction of the at least one agent.

16. The system of claim 14, further including merging the motion field from the road structure and the motion field from the past trajectory, wherein the motion fields are merged into a merged motion field that indicates future motion constraints of the at least one agent traveling within the roadway environment that are based on roadway structural constraints and trajectory constraints.

17. The system of claim 16, further including outputting the predicted speed of motion of the at least one agent based on past trajectory lengths associated with the past trajectory of the at least one agent at a plurality of past time steps.

18. The system of claim 17, wherein predicting the future trajectory of the at least one agent includes multiplying the merged motion field with the predicted speed of motion of the at least one agent to determine the displacement field, wherein the displacement field indicates trajectory prediction of the at least one agent based on the predicted direction as determined based on the past trajectory and a length of movement based on the predicted speed of motion within the roadway environment during at least one future time step.

19. A non-transitory computer readable storage medium storing instructions that when executed by a computer, which includes a processor performing a method, the method comprising:
- receiving birds-eye image data associated with travel of at least one agent within a roadway environment;
- analyzing the birds-eye image data to determine a potential field associated with the roadway environment;
- analyzing the birds-eye image data to determine a potential field associated with a past trajectory of the at least one agent; and
- predicting a future trajectory of the at least one agent based on analysis of the potential fields, wherein a predicted direction and a predicted speed of motion of the at least one agent within the roadway environment are modeled to generate the future trajectory by recurrently moving past a location on a displacement field.

20. The non-transitory computer readable storage medium of claim 19, wherein predicting the future trajectory of the at least one agent includes multiplying a merged motion field with a predicted speed of motion of the at least one agent to determine the displacement field, wherein the displacement field indicates trajectory prediction of the at least one agent based on the predicted direction as determined based on the past trajectory and a length of movement based on the predicted speed of motion within the roadway environment during at least one future time step.

* * * * *